Fig. 1.

INVENTORS
CHARLES H. ZWEIFEL
GEOFFREY H. CRITTENDEN
ROBERT R. YOUNG
BY
ATTORNEY

United States Patent Office 3,486,641
Patented Dec. 30, 1969

3,486,641
BULK LOADER, UNLOADER, AND CARGO CONTAINER HANDLING CRANE AND METHOD
Charles H. Zweifel, Oakland, Geoffrey H. Crittenden, Alameda, and Robert R. Young, Danville, Calif., assignors, by mesne assignments, to Fruehauf Corporation, Detroit, Mich., a corporation of Michigan
Continuation of application Ser. No. 592,156, Nov. 4, 1966. This application Jan. 27, 1969, Ser. No. 797,359
Int. Cl. B63b 27/10, 27/00
U.S. Cl. 214—14                                   41 Claims

ABSTRACT OF THE DISCLOSURE

A crane having a folding apron, which also extends rearward of the crane, supports both a movable trolley rigged for cargo container, bucket, cargo hook, and scrap skip operation, and a movable hopper. A telescoping reversible conveyor is supported from the lower end of the hopper, and the hopper and conveyor can be moved to a position rearward of the crane on the rearward extending apron.

---

This is a continuation of application Ser. No. 592,156, filed Nov. 4, 1966, now abandoned.

BACKGROUND OF THE INVENTION

Field of the invention

This invention relates to a combination loader-unloader crane and more particularly to a crane capable of loading and unloading bulk material, operation of a magnet, cargo hook, or a scrap skip, or the handling of cargo containers.

Description of the prior art

Many types of cranes and structures have been utilized for the loading and unloading of cargo transported by ships. Presently, the efficient loading of bulk materials is accomplished by conveyor systems which transport the material to a loading chute extending into the hold of a ship. Conversely, the unloading of bulk materials is usually effected by a clamshell bucket which scoops the material out of the ship, a bucket load at a time, and transports each bucket load from the ship to a dockside take-away conveyor or conveyance such as a railroad car.

Until recently, crated and large "piece" cargo has been most efficiently handled by being strapped to pallets and transported between the ship and dockside by means of a sling suspended from a cargo hook. A recent innovation in the handling of such cargo has been the use of cargo containers which are loaded at the factory, moved to dockside on a flat bed trailer or railroad car, and are lifted on board ship as a unit. These containers are self-supporting to permit stacking in layers and their use permits greater amounts of cargo to be moved with each cycle of the crane.

The most common type of cargo handling cranes are provided with a cargo hook and only a simple boom. Cranes of this type require only a single set of wire rope reeving. A magnet can be suspended from the hook for handling scrap metal.

A bucket crane can also be operated from a simple boom, but requires two sets of wire rope reeving; a first set for taking in rope to close the clamshell doors and to lift the bucket and a second set, independently driven, for helping the first set lift a loaded bucket and to hold the bucket when the first set lets out rope to open the clamshell doors.

A crane used for operation of a bucket can also be converted to operate a magnet or a cargo hook because all such handling means can be suspended from basically single point suspension. When utilizing a bucket crane for operating a magnet or a cargo hook, one set of reeving can be either disengaged or operated synchronously with the other set.

The characteristics of a crane used for handling cargo containers are quite different from those of a hook or bucket crane. It is necessary to provide a stable lifting platform for the cargo container handling equipment to keep the cargo containers level during movement. This generally requires at least four sets of lifting ropes, spaced in a rectangular pattern, and an integrated synchronously driven reeving system to lift each corner of the cargo container at an equal rate irrespective of the distribution of load within the container. The ropes must therefore be suspended from a platform having a much larger supporting base than is generally necessary for a crane reeved for operation of a clamshell bucket or a cargo hook.

Due to the large size and loading capacity of the cargo containers, a larger and different type of crane is required than has generally been employed for the purpose of loading and unloading ships. The strength of the structure, overall size, lifting capacity, reach and lift are all necessarily greater.

Cargo containers usually require a boom in the form of a horizontally disposed relatively wide apron to provide the supporting base necessary for operating container handling equipment. A movable trolley is used to transport the cargo containers along the apron between the ship and dockside. For effecting horizontal movement of a load suspended from a simple boom crane, the boom proper is either raised or lowered or rotated about its base or both.

In view of the increased size and capacity of container handling cranes, they are considerably more expensive than the standard type. It therefore becomes very desirable to eliminate the need for multiple cranes at dockside and to provide a combination loader-unloader for handling containers, bulk material, and other types of cargo. Aside from the cost, multiple structures at dockside take up excessive space which is already at a premium in port areas.

Before the invention of the present crane, none of the available cranes could both load and unload general cargo, scrap metal, cargo containers, and bulk material. Docking facilities have only been able to handle the particular type of cargo that the crane provided at dockside could accommodate. The present invention has incorporated the most advanced cargo handling means for both the loading and unloading of nearly all types of cargo into a single integrated unit. It permits each docking berth in a port area to have the capability of the most efficient handling of virtually any type of cargo.

Prior to the introduction of cargo containers, many cargo handling cranes were considered to be combination loaders-unloaders. For bulk material handling, loading cranes utilize conveyor systems to deliver the material right to the loading hatch of a ship. When a clamshell bucket is integrated into a crane of this type, it can be considered a combination bulk loader-unloader. Since a magnet or a cargo hook can be substituted for a bucket, the same crane can also handle other types of cargo and therefore can be considered a "universal" loader-unloader. But, since cargo containers require four-corner suspension and complicated reeving, there has not been a loader-unloader crane which efficiently integrates a container handling capability into a bulk loader-unloader.

In addition to integrating these two capabilities into a single crane, applicants have provided a new and more efficient means for unloading bulk material than heretofore known by suspending a movable hopper and conveyor system from the crane apron. This permits a bucket, reeved from the container handling trolley on the apron, to simply scoop the bulk material out of the ship and deposit it in a hopper disposed closely adjacent the working area and eliminates the customary horizontal movement of the bucket to dockside and back. This reduces bucket cycle time and leakage losses.

SUMMARY OF THE INVENTION

Applicants have devised a new loader-unloader which comprises, briefly, a supporting frame having an apron extendable outboard therefrom with cargo handling means for combination loading and unloading of cargo containers and operation of a bucket, a magnet, a cargo hook, or a scrap skip therefrom. A movable hopper is suspended from the apron, and a movable bridge is supported by the frame. Means are provided for attaching a loading chute to the outboard end of said bridge. A conveyor means is provided on the bridge for transporting bulk material to the loading chute when the crane is arranged for loading bulk material and away from the hopper when the crane is arranged for unloading bulk material. Means are provided for permitting movement of cargo containers to and from a dockside storage or deposition area.

The concept of the invention also includes the method of converting and operating the combination loader-unloader which comprises, briefly: For loading bulk material, moving the bridge outboard over an adjacently docked ship, securing a loading chute adjacent the outboard end of the bridge and lowering the discharge end of the chute into the hold of the ship, and transporting bulk material along the bridge to the loading chute; for bulk unloading, moving the bridge outboard over the ship, positioning the hopper over the outboard end of the bridge, operating a movable clamshell bucket from the apron to unload bulk material from the hold of the ship and to discharge it into the hopper, and transporting the bulk material from the hopper inboard along the bridge; for loading or unloading operations by means of a magnet, a scrap skip, a cargo hook, or a clamshell bucket, moving the hopper and the bridge inboard and to a position rearward of the supporting frame, suspending a movable magnet, cargo hook, scrap skip, or clamshell bucket from the apron, operating the magnet, cargo hook, scrap skip, or clamshell bucket along the apron between the ship and the area beneath the supporting frame of the crane to load or unload cargo; for the loading or unloading of cargo containers, moving the hopper ond the bridge inboard and to a psition rearward of the supporting frame, suspending a movable cargo container lifting spreader from the apron, and operating the lifting spreader along the apron between the ship and the area beneath the supporting frame of the crane to load or unload cargo containers.

OBJECTS OF THE INVENTION

Therefore, it is an object of the present invention to provide an efficient high-speed combination cargo loader-unloader which, from a crane structure having only a single folding apron, can handle cargo containers, bulk material, palletted cargo, scrap metal or any other cargo which can be loaded or unloaded by a lifting spreader, clamshell bucket, cargo hook, magnet, a skip, or a conveyor system.

It is another object of the present invention to provide an efficient high-speed combination cargo loader-unloader which can easily and quickly be converted from any type of cargo handling operation to another and without re-reeving any of the wire ropes.

It is a further object of the present invention to provide an efficient high-speed combination cargo loader-unloader which permits access to the storage or working area within the base of the crane by a cargo handling means suspended from a trolley on the apron of the crane.

It is yet another object of the present invention to provide a bulk unloader which permits the bucket discharge hopper and take-away conveyors to be moved outboard adjacent the bucket operating area to increase the efficiency of the unloading operation by decreasing the horizontal travel of the unloading bucket and thereby reducing bucket leakage losses and bucket cycle time.

It is yet a further object of the present invention to provide a bulk loader and unloader which utilizes a telescoping high-speed reversible conveyor system for movement of bulk material to and from the ship during loading and unloading operations.

It is still another object of the present invention to provide a combination crane which permits movement of the hopper and reversible conveyor system of the bulk handling equipment to a position inboard and rearward of the crane supporting frame to counterbalance the apron of the crane when operating the other types of cargo handling equipment.

It is still a further object of the present invention to provide a new method of converting and operating a combination loader-unloader.

Other objects and advantages of the present invention will become apparent when the combination cargo loader-unloader crane is considered in conjunction with the accompanying drawings.

DESCRIPTION OF THE PREFERRED EMBODIMENT

Figure 1:
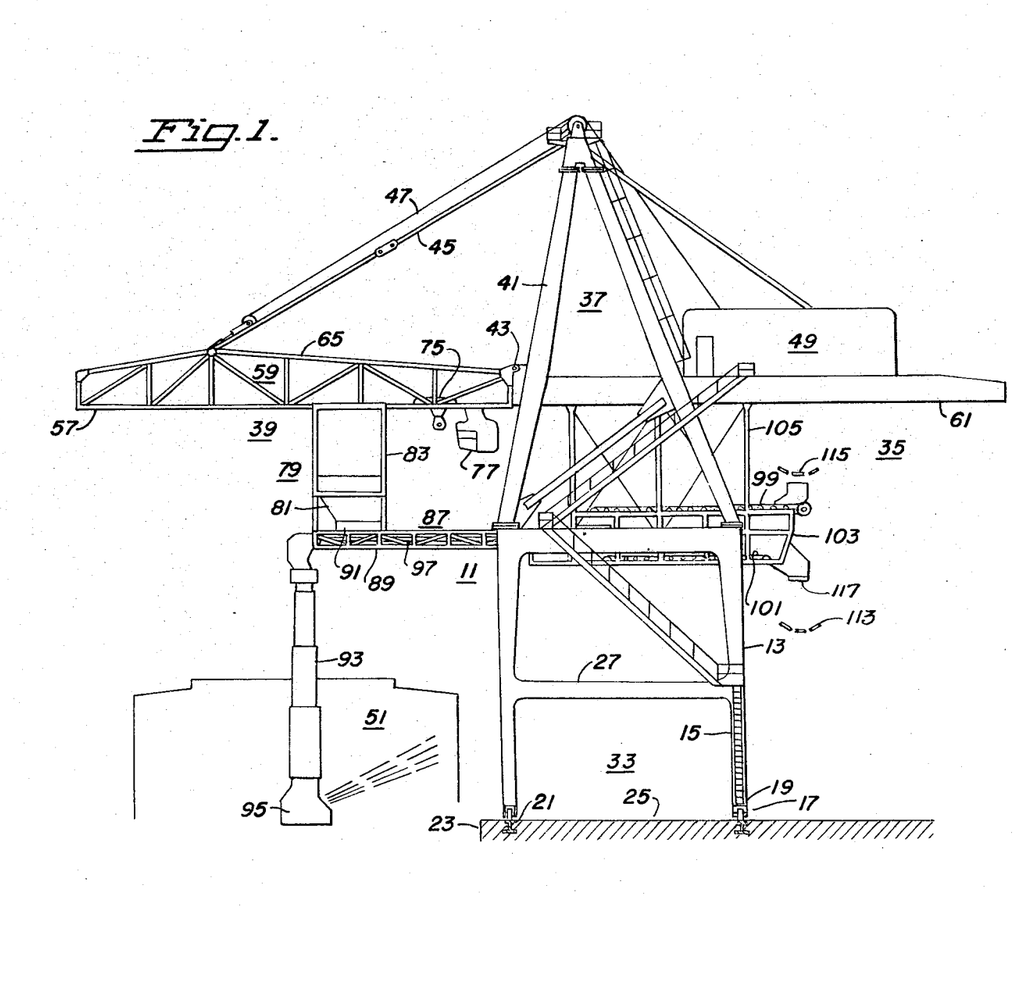
FIGURE 1 is a side elevation of a preferred embodiment of the crane of the present invention arranged for bulk loading.

Reference is made to the drawings for a description of the invention. The side elevation shown by FIGURE 1 illustrates a preferred embodiment thereof. A crane frame 11 has a base portion 13 including four vertical legs 15 which terminate in trolleys 17 at their lower ends 19. The trolleys travel on rails 21 which are disposed parallel to the edge 23 of the dock or pier 25. By this means, the crane can be moved along parrallel to the edge of the dock to adjust to the variable docking positions of the ships or to service a number of berths arranged in tandem.

The vertical legs are interconnected by crossbeams 27, 29, 31 of different elevation. When the side elevation of the crane is viewed (FIGURE 1), a cross beam 27 is seen which extends between the two vertical legs. A similar crossbeam likewise extends between the two hidden legs. These two lateral crossbeams are positioned sufficiently high above the dock 25 to permit passage thereunder of railroad cars and loading vehicles such as trucks or mobile container cranes as illustrated by U.S. Patent 3,110,404 to Anthony J. DeStasi.

Figures 2, 3:
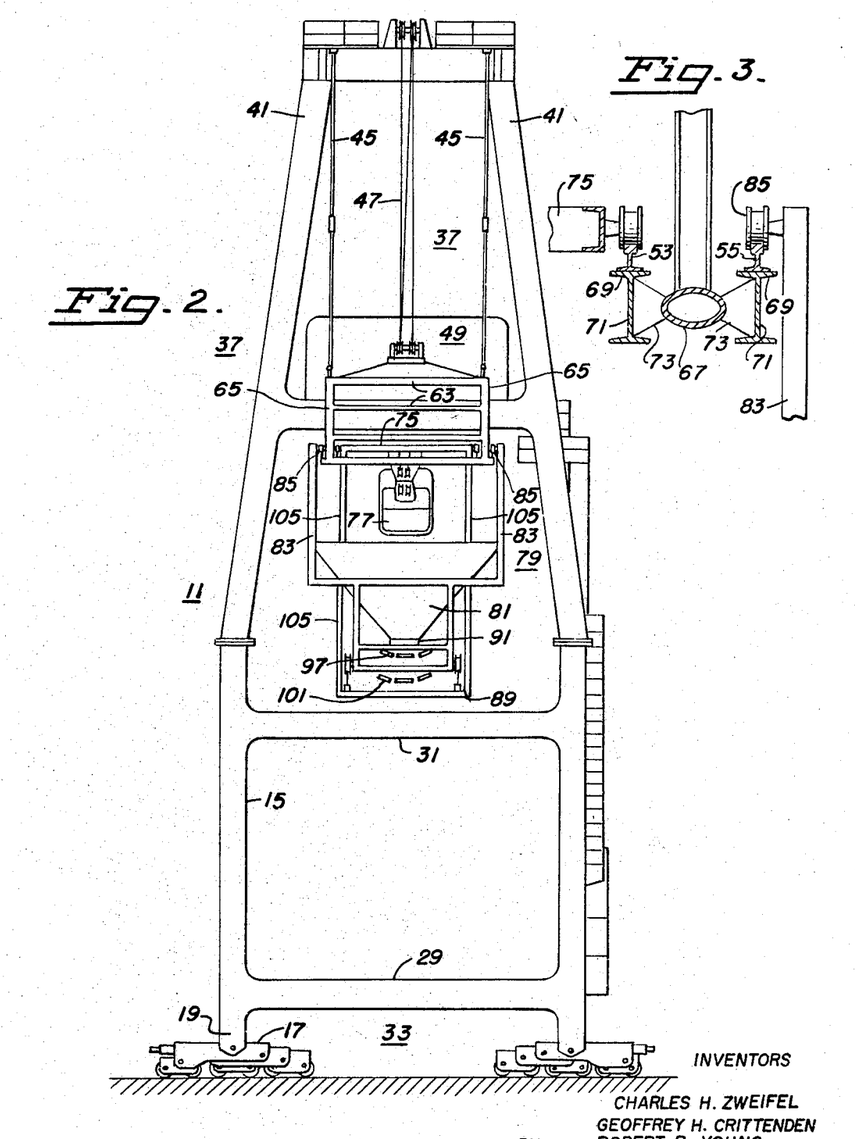
FIGURE 2 is a front elevation of the crane of the present invention.
FIGURE 3 is a front elevation detail of the crane of the present invention showing the arrangement of the trolley rails.

The single crossbeam 29 interconnecting the two front legs (FIGURE 2) is disposed relatively low with respect to the position of the lateral crossbeams 27. The low position reduces the amount of lift required of the cargo handling equipment when it moves a load between an adjacently docked ship and the storage or working area 33 under the crane.

There are two supporting crossbeams between the legs at the rear of the crane, the lower of which is hidden in the front view (FIGURE 2) by crossbeam 29. The upper rear crossbeam 31 is disposed at a position somewhat below the upper ends of the legs. This arrangement permits the cargo handling equipment relatively unimpeded access to the working area 33 under the crane from the front of the crane and permits moving a portion of the cargo handling equipment to a position 35 actually behind or rearward thereof.

The base portion 13 of the crane supports an upward projecting superstructure 37 and an outward projecting folding apron 39. The superstructure is comprised of two interconnected A-frames 41 supported at their lower ends by the upper ends of the legs 15 of the base portion 13. The folding apron 39 is hinged 43 to the superstructure at its inboard end and is supported from the superstructure, near its outboard end, by a pair of folding links 45 which carry the apron load. (The term "outboard" as used in this context relates to a direction generally perpendicular to the edge of the dock or pier, away from the crane, out over the adjacent berthing area—and "inboard" the converse thereof.) Wire rope reeving 47, driven from the machinery house 49, is provided for raising and lowering the apron. When the apron is lowered to a horizontal position, it projects outboard beyond the edge 23 of the dock or pier and over any ship 51 which might be docked alongside thereof.

Two pair of trolley rails 53, 55 run longitudinal of the apron 39 with one pair of the rails of narrower gauge than the other pair. The narrower gauge pair 53 is disposed parallel and between the wider gauge pair 55. In the preferred embodiment, these rails are suspended from the outer lower edges 57 of the apron side frames 59 and run inboard beyond the junction of the apron with the crane and continue rearward of the crane frame on the cantilevered rail extensions 61. The apron is formed by a pair of side frame structures 59 which are interconnected by crossmembers 63 secured between the upper stringers or upper edges 65. The lower edges 57 of the side frames are formed of a pair of straight tubular spars 67, one of which is illustrated in cross-section by FIGURE 3. One track 53, 55, of each pair of rails is supported alongside each side frame spar 67 by being secured to the top flanges 69 of I beams 71 which are in turn supported by gussets 73 secured crosswise to the spars 67. By this arrangement of supporting the rails, no crossmember, or other structure interconnecting the apron side frames, interferes with the cargo handling apparatus suspended from the apron.

A first or sheave trolley 75 is supported on the inner pair of rails 53. The trolley can be moved outboard to a position near the end of the apron, or inboard over the working area 33, and rearward to the end of the cantilevered rail extensions 61. Thus, the trolley 75 can position over cargo located anywhere within the reach of the apron 39, or under the crane, or to the rear of the crane to the end of the extensions 61. An operator's cab 77 is suspended from the sheave trolley to move with it for continuous and close observation of the loading-unloading operations.

The sheave trolley 75 comprises the means which are provided on the crane for the combination loading and unloading of cargo containers and operation of a bucket, or magnet, a cargo hook, or a scrap skip from the apron. The trolley carries a number of wire rope sheaves which form a part of a reeving means for suspending either a cargo container lifting spreader, a clamshell bucket, a magnet, a cargo hook, or a scrap skip. This reeving means is described in co-pending application, Serial No. 567,436, Convertible Cargo Handling System by Charles H. Zweifel, filed July 25, 1966. That application is hereby made a part of this disclosure for the purpose of providing a complete description of the invention.

A movable hopper trolley 79 is supported on the outer or wider gauge rails 55 and moves independent of the sheave trolley 75, but, like the sheave trolley, can be moved from a position near the outboard end of the apron to a position rearward of the crane frame on the cantilevered rails 61. A hopper 81, for receiving material dumped by a clamshell bucket suspended from the sheave trolley, is supported under the apron 39 by vertically depending beams 83 having trolley wheels 85 journalled at their upper ends. The sheave trolley rides "above" the inner rails while the hopper trolley is suspended from the outer rails. The hopper 81 is suspended far enough below the apron to permit the clamshell bucket to lift a load of bulk material out of a ship's hold, move it over the sides of the hopper, and deposit it in the hopper. Actually, any of the cargo handling equipment can be made to pass over the hopper and be operated from the rear extensions 61. These operations are controlled by the bucket operator in the cab 77 of the sheave trolley.

A movable bridge 87 supported by the crane frame is provided which includes a telescoping boom 89 supported by and disposed directly below the apron 39. Its outboard end is secured to the hopper trolley framework 83. The outboard end of the telescoping boom extends under the lower end 91 of the hopper and is carried with and supported by the hopper trolley whereby it is integrated for movement therewith. This described arrangement is the simplest and least expensive to construct, but it is realized that the bridge could be made as a cantilevered self-supporting boom and thereby operate independent of the hopper, or the bridge could be supported independently from the apron by a separate trolley or movable supporting structure. However, these are simple variations of the basic idea of the present invention to provide a suspended hopper and an extendable reversible conveyor system for increased efficiency in bulk material handling.

A demountable or retractable telescoping loading chute 93 can be secured to the outboard end of the telescoping boom. The chute depends from the discharge end of the reversible conveyor and can be telescoped downward into the hold of a docked ship 51. A thrower 95 is located at the lower end of the loading chute for spreading the bulk material uniformly around the hold. When the chute is not in use, and if it is of a demountable variety, it can be removed and left on the dock. If the chute is arranged to retract, it can be tucked under and pinned to the bottom of the telescoping boom frame work 89 or, in some other manner, secured out of the way of the other cargo handling operations.

The movable bridge 87 includes means for transporting bulk material therealong in both directions. This is effected by a reversible continuous belt conveyor 97 on the telescoping boom which extends under the discharge gate at the lower end 91 of the hopper. For the unloading of bulk material, the conveyor transports bulk material inboard from the hopper; for loading, the direction of operation is reversed, and the conveyor transports bulk material outboard to the loading chute 93.

The movable bridge 87 includes a pair of over-and-under conveyors 99, 101 which are arranged at the inboard end of the telescoping boom 89. They are disposed one above the other in spaced relation to permit the telescoping boom and the reversible conveyor 97 to be retracted therebetween when not in use. The over-and-under conveyors are mounted in a movable conveyor framework 103 which is suspended by beams 105 similar to those supporting the hopper and have rollers 107 at their upper ends which travel on the same rails 55 as those provided for the hopper 81. The conveyor framework 103 can be moved to a position completely rearward of the crane frame 11 by virtue of the rails on the cantilevered beams 61.

The inboard end of the telescoping boom is interconnected with and supported by the movable conveyor framework 103 and can move relative thereto but is continuously interconnected therewith. The three conveyors cooperate for handling bulk material. For loading a ship, the upper 99 of the over-and-under conveyors transports bulk material in an outboard direction and dumps it onto the reversible conveyor 97 for carriage to the loading chute 93. When the crane is unloading, the bulk material is transported inboard by the reversible conveyor and is dumped onto the lower 101 of the over-and-under conveyors for further carriage inboard where it is discharged into other conveyors or conveyances, such as railroad cars, for removal from the dock. The conveyors 99, 101 are arranged to cooperate with the reversible conveyor 97 irrespective of the amount of extension of the telescoping boom 89. At any position, the conveyors operate to carry bulk material in the manner described.

The interconnection of the telescoping boom, the hopper, and the over-and-under conveyors permits them to move in an integrated manner. They can be extended to operating condition, retracted to a storage position above the base portion of the crane, or they can be removed to a position 35 rearward of the crane on the projecting beams 61, or siding means, to permit the sheave trolley 75 access to the deposition area 33 under the crane.

Prime mover and power transmission means are located on the crane, in the machinery house 49, for powering the combination loader-unloader crane.

The siding means are provided by the crane for removing interfering equipment from proximate the apron thereby permitting movement of cargo containers, or any cargo, to and from a dock-side storage or deposition area. This could be effected by placing the crane at a distance from the edge of the dock and using the space between the edge of the dock and the crane as the storage or deposition area. However, an arrangement of this sort would require an unnecessarily long apron, the long apron would unbalance the crane, and such an arrangement would take up excessive dock area. The preferred embodiment of the present invention, which utilizes the area 33 under the crane as a deposition area, permits the crane to be positioned closely adjacent the edge of the dock whereby a relatively short apron may be used.

The capability of the present invention to move the hopper and conveyor system to a removed position rearward of the crane, to permit the cargo handling means access to the area thereunder, provides a counterbalancing weight to the apron 39 when the sheave trolley is loading or unloading the heavy cargo containers. The ability of the hopper and conveyor system to counterbalance the apron permits the crane to be constructed with a relatively small base area and the loading of the trolleys 17 equalized.

Figure 4:
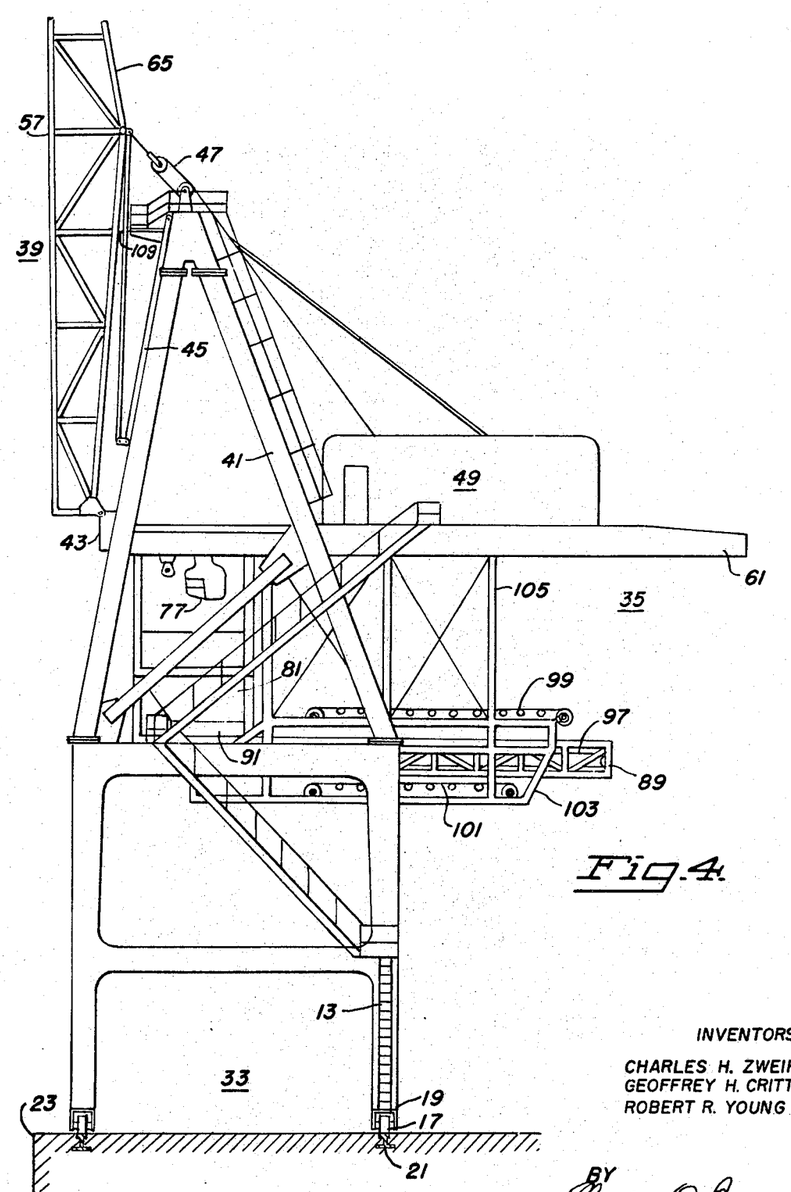
FIGURE 4 is a side elevation of the crane of the present invention arranged in storage configuration.

At such times as when a ship is moving into or out of a berthed position, or when the crane is being moved along the dock, the cargo handling equipment of the crane, including the apron 39, the sheave trolley 75, the over-and-under conveyors 103, and the telescoping boom 89 is retracted to the storage arrangement as illustrated by FIGURE 4. All of the equipment is gathered as near the center of gravity of the crane as possible. This is done to prevent the possibility of damage occurring to the crane if the members are left extended by the inertia of members acting through a long moment arm to create excessive rotational stresses on the supporting structure. It is also done to prevent the possibility of interference of an extended member with adjacent structures, such as a ship's rigging or superstructure, or with apparatus located rearward of the crane. To achieve this condition, the apron is raised to a generally vertical position by means of the lifting cables 47 and is located in its vertical position by a latching means such as a hook 109 which extends between the A-frames 41 and the apron. Before the apron is raised, the sheave trolley 75 and the hopper trolley 79 are retracted to a position between the A-frame members 41 of the superstructure. The telescoping conveyor can likewise be retracted to a position between the A-frames while the over-and-under conveyors normally operate from a position therebetween. The over-and-under conveyors are independently driven and move to the position rearward of the crane frame when the hopper trolley retracts to that position because the hopper trolley is on the same set of rails as the over-and-under conveyors.

Figure 5:
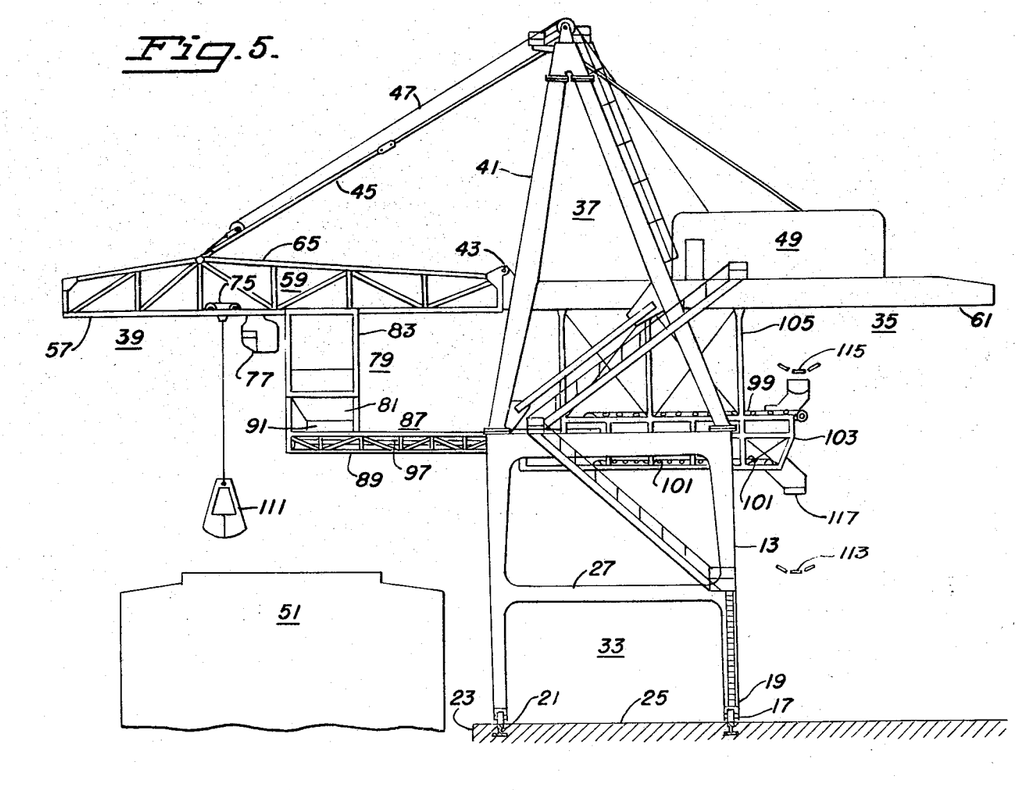
FIGURE 5 is a side elevation of the crane of the present invention arranged for bulk unloading.

FIGURE 5 of the drawings shows the combination loader-unloader crane arranged for unloading bulk material. The apron 39 is lowered until the weight is carried by the foldable links 45. The apron lifting ropes 47 are thereby relaxed and their hoist drum locked permitting the motor which operates the lifting reeving to be utilized for other functions. The hopper trolley 75 is independently motor driven to move the hopper into a position over the hold of a ship and carries or extends the telescoping boom outboard with it. A clamshell bucket 111 is suspended from the reeving of the sheave trolley 75 for digging the bulk material out of the hold of the ship 51. As the bucket moves its point of digging within the hold, the hopper can be moved to keep a fixed relation between it and the operation of the bucket. This permits the shortest possible horizontal movement of the bucket during unloading.

Since conveyors can transport material much faster horizontally than a single bucket can, it is desirable to eliminate as much horizontal movement of the bucket as possible for the greatest efficiency. The short horizontal movement of the bucket, effected by the mobility of the hopper, in addition to reducing bucket cycle time, necessarily shortens the time the bulk material is carried in the bucket, thereby decreasing the period of time for leakage of material therefrom to occur. This also reduces the dust problem which is usually associated with this type of bulk unloading operation. The bucket operates continuously over the hold of the ship whereby most of the leakage falls back into the ship. After the bulk material is deposited in the hopper 81, it is discharged from the lower end 91 thereof onto the reversible conveyor 97 of the telescoping boom and is carried inboard where it spills onto the lower 101 of the over-and-under conveyors from which it is wiped off and chuted onto a take-away conveyor 113 or to a chute or hopper which feeds it to dockside railroad cars.

Figure 6:
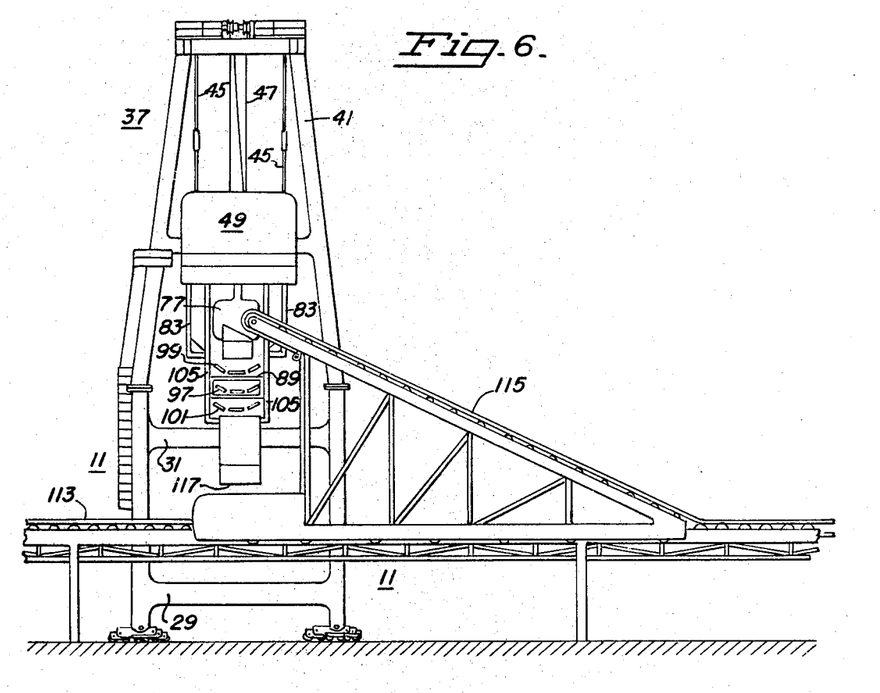
FIGURE 6 is a side elevation of a feed/take-away conveyor system disposed at the rear of the crane perpendicular to the axis of the apron of the crane of the present invention.

FIGURE 6 of the drawings shows the arrangement of conveyors located at the rear of the crane for taking away or delivering bulk materials to the over-and-under conveyors. If the bulk material storage area is located at an area remote from the crane, a system of conveyors can be utilized for carrying the material to and from the crane. If the material is conveyed to the crane, it proceeds, in the drawing, on the continuous belt 113 from right to left, up the elevator 115, and is dumped off onto the upper 99 of the over-and-under conveyors. For unloading operations, the same conveyor system is used and the belt continues to run in the same direction. The bulk material is wiped off the lower 101 of the over-and-under conveyors, or simply dumped from the end thereof, onto the belt 113 at a point 117 below its loading discharge elevation. The bulk material is then carried away to the remote storage area or possibly wiped off at progressive points along the conveyor into a line of railroad cars.

On the other hand, if the bulk material is transported to the crane in individual conveyances, such as by railroad cars, an elevator can be substituted for the conveyor system to lift the bulk material from the railroad cars to the upper of the over-and-under conveyors. For unloading into individual conveyances, the lower of the over-and-under conveyors simply spills the material into a chute or hopper as described. This chute or hopper can be arranged to load conveyances located to the rear of the crane or beneath it. Any number of other systems will also be compatible with the crane of the present invention and the foregoing are just suggested arrangements.

FIGURE 1 of the drawings shows the arrangement of the cargo handling equipment when the crane is used for loading bulk material. The bucket can be lifted up and held out of the way beneath the trolley by locking the hoist drums which control it, or the clamshell doors can be detached and left on the dock and the bucket headblock lifted up and pin-connected to the framework of the sheave trolley 75. The telescoping loading chute 93 is attached to the outboard end of the telescoping boom 89. The boom is extended by means of the hopper trolley 79 to a position with the loader over the hold of the ship 51. After the loader is telescoped into the hold of the ship, bulk material is transported to the upper 99 of the over-and-under conveyors by either of the previously described or any other suitable means. The bulk material is then spilled from the upper conveyor onto the reversible conveyor 97 where it is carried outboard to the loading chute 93. It then drops through the loading chute into the thrower 95 secured to the lower end of the loading chute which evenly distributes the material around the hold of the ship.

Figure 7:
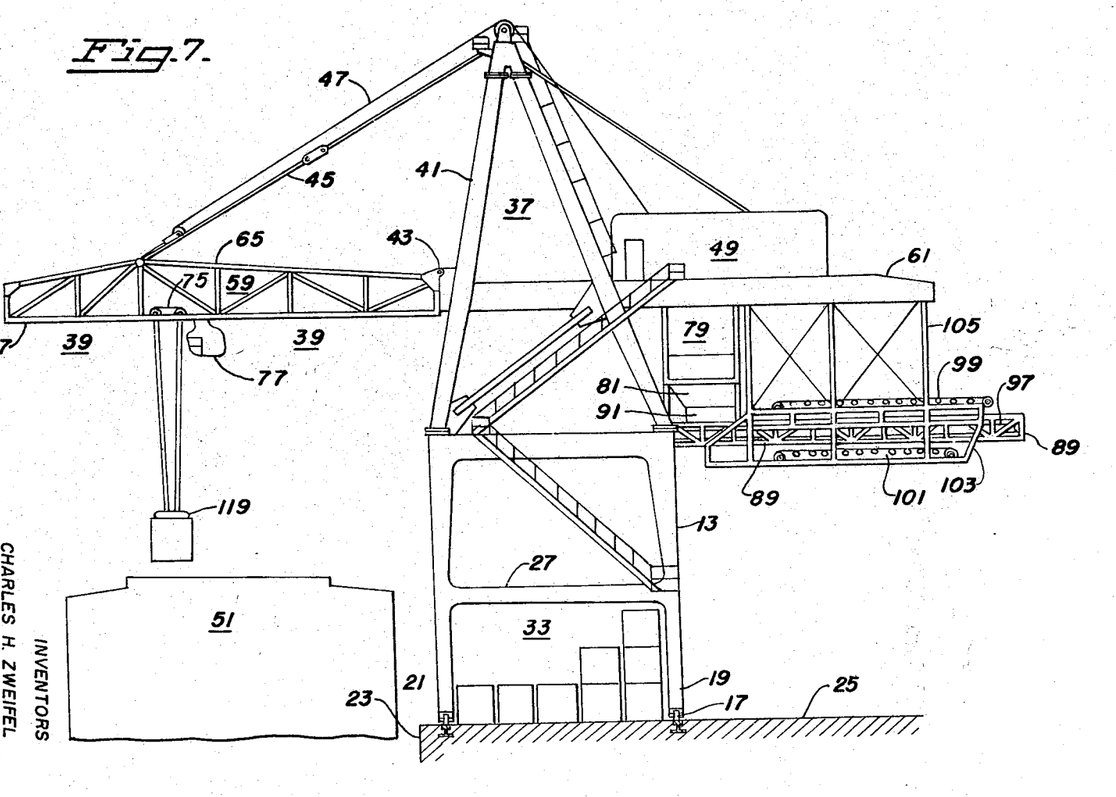
FIGURE 7 is a side elevation of the crane of the present invention arranged for cargo container handling.

When the crane is to be utilized for handling cargo containers, the crane is arranged as illustrated by FIGURE 7. The hopper, the telescoping boom, and the over-and-under conveyors are removed to a position rearward of the crane. The bucket doors are removed and the bucket headblock is pinned to the sheave trolley 75. A cargo container lifting spreader 119 is secured to its head frames which are suspended from the reeving of the sheave trolley. The crane is then operated to move cargo containers between the deposition area and the adjacently berthed ship to load or unload cargo containers directly on or off flatbed railroad cars or trailers under the crane.

When it is desired to utilize a cargo hook, a magnet, or a skip for handling cargo, the crane is arranged for operation in a manner resembling that for handling cargo containers as described above (FIGURE 7) except that the hook, magnet or skip, is reeved from the sheave trolley. Operation of the crane then proceeds as it would with any other type of crane utilizing such cargo handling means.

The concept of the invention also includes the method of converting and operating a combination loader-unloader crane and comprises: For loading bulk material into ships, moving the hopper 81 outboard along the apron 39 and extending the telescoping boom 89 over an adjacently docked ship 51, lowering the discharge end of the loading chute 93 into the hold of the ship, operating the reversible conveyor 97 and the upper 99 of the over-and-under conveyors to transport bulk material in an outboard direction, feeding the bulk material to be loaded into the ship onto the inboard end of the upper of the over-and-under conveyors and conveying the bulk material to the outboard end of the upper of the over-and-under conveyors and discharging it onto the reversible conveyor and conveying it outboard to the end of the reversible conveyor and discharging it into the upper end of the loading chute; for unloading bulk material from an adjacently docked ship, moving the hopper outboard along the apron and extending the telescoping boom outboard over the ship, securing the loading chute out of the way of the unloading operation, suspending a clamshell bucket 111 from the reeving means of the trolley, operating the bucket to scoop bulk material from the hold of the ship and to lift the bulk material to a position above the hopper and to discharge the bulk material thereinto, operating the reversible conveyor and the lower of the over-and-under conveyors in an inboard direction, discharging the bulk material from the hopper onto the reversible conveyor, conveying the bulk material inboard along the telescoping boom and discharging it onto the lower of the over-and-under conveyors and further conveying it inboard and discharging it onto a take-away means; for operation of a magnet, a scrap skip, a cargo hook, or a clamshell bucket to load or unload material from an adjacently docked ship, moving the hopper inboard along the apron and telescoping the boom between the over-and-under conveyors and moving the hopper and the telescoped boom and the over-and-under conveyors to a removed position rearward of the crane frame, suspending either a magnet, a scrap skip, a cargo hook, or a clamshell bucket from the reeving means of the sheave trolley, and operating the magnet, cargo hook, scrap skip, or clamshell bucket between the ship and the area beneath the crane to load or unload the ship; for the loading or unloading of cargo containers from an adjacently docked ship, moving the hopper inboard along the apron and telescoping the boom between the over-and-under conveyors and moving the hopper and the telescoped boom and the over-and-under conveyors to a position rearward of the crane frame, suspending a cargo container lifting spreader from the reeving means of the sheave trolley and operating the cargo container lifting spreader between the ship and the area beneath the crane to load or unload cargo containers.

It is to be realized that the foregoing steps for each type of cargo handling operation need not necessarily be performed in the order set forth and that it is possible to change directly from any type of cargo handling operation to any other.

The unique capabilities of the combination loader-unloader crane here described make it the most versatile crane heretofore known for the use in the handling of all types of cargo. Bulk material can be brought to the crane from remote storage areas by conveyor systems, or it can be brought to the crane by railroad cars which can pass under, or rearward of, the crane. Likewise cargo, such as handled in cargo containers, can also be brought right to the crane by means of railroad cars, or flatbed truck trailers, and loaded directly from the transporting means onto the ship. Conversely, the cargo can be unloaded from the ship directly onto railroad cars or trucks disposed beneath the crane. The horizontal travel of the bucket for bulk unloading has been reduced by means of the movable hopper to increase the efficiency and reduce leakage loses. When not in use, the bulk handling equipment acts as a counterbalance for cargo container operations. The versatile and efficient cargo handling means inherent in the crane of the present invention permit each dock in a port to handle all types of cargo by a single structure. These characteristics provide many advantages not heretofore found in the prior art of combination cargo loader-unloaders.

It will be apparent from the foregoing description of the invention, in its preferred form, that it will fulfill all of the objects attributable thereto, and while it is illustrated and described in detail, the invention is not to be limited to such details as have been set forth except as may be necessitated by the appended claims.

We claim:

1. A combination cargo loader-unloader crane comprising
    a supporting frame having an apron extendible outboard therefrom,
    cargo handling means mounted on said apron capable of combination cargo container handling and operation of a bucket, magnet, cargo hook, or scrap skip from said apron,
    a hopper suspended from said apron and movable therealong to an outboard bulk unloading position and inboard to a removed position,
    a movable bridge supported by said frame and having bulk material loading means disposed at the outboard end thereof, said bridge movable to outboard bulk loading and unloading positions and inboard to a removed position,
    conveyor means on said bridge for transporting bulk material to the bulk material loading means when said crane is arranged for loading bulk material and away from said hopper when said crane is arranged for unloading bulk material, and
    means for moving said hopper and said bridge to the removed positions permitting said cargo handling means to move cargo containers between a ship and a dockside storage or deposition area under said crane.

2. The combination cargo loader-unloader crane of claim 1 wherein said cargo handling means includes a movable trolley on said apron reeved for suspending a cargo container lifting spreader, a clamsheel bucket, a magnet, a cargo hook, or a scrap skip.

3. The combination cargo loader-unloader crane of claim 1 wherein said movable bridge is disposed below said apron and the outboard end of said bridge is secured to and supported by said hopper.

4. The combination cargo loader-unloader crane of claim 1 wherein the bridge supported by said frame comprises a telescoping boom and conveyor means, the outboard end of said telescoping boom being secured to the bottom of said movable hopper.

5. The combination cargo loader-unloader crane of claim 4 wherein said conveyor means includes a reversible conveyor carried by said telescoping boom.

6. The combination cargo loader-unloader crane of claim 1 wherein said bridge is movably suspended from said apron.

7. The combination cargo loader-unloader crane of claim 1 wherein said means for permitting movement of cargo containers between a ship and a dockside storage or deposition area includes means for permitting said hopper and said movable bridge to be moved to a counterbalancing position rearward of said crane.

8. The combination cargo loader-unloader crane of claim 1 wherein said bulk material loading means includes a removable chute.

9. A combination cargo loader-unloader crane comprising
a supporting frame having an apron extendible outboard of said frame and an apron continuation extending rearward thereof,
cargo handling means mounted on said apron capable of combination cargo container handling and operation of a bucket, magnet, cargo hook, or scrap skip from said apron
a hopper supported by said frame and movable to an outboard bulk unloading position and inboard to a removed position,
a bridge suspended from said apron and movable therealong to outboard bulk loading and unloading positions and rearward of said frame to a removed position,
conveyor means on said bridge for transporting bulk material to the bulk material loading means when said crane is arranged for loading bulk material and away from said hopper when said crane is arranged for unloading bulk material, and
means for moving said hopper to the removed position when said bridge is moved to a position rearward of said crane permitting said cargo handling means to move cargo containers between a ship and a dockside storage or deposition area under said crane.

10. The combination cargo loader-unloader crane of claim 9 wherein said cargo handling means includes a movable trolley on said apron reeved for suspending a cargo container lifting spreader, a clamshell bucket, a magnet, a cargo hook, or a scrap skip.

11. The combination cargo loader-unloader crane of claim 9 wherein the bridge supported by said frame comprises a telescoping boom and conveyor means, the outboard end of said telescoping boom being secured to the bottom of said movable hopper.

12. The combination cargo loader-unloader crane of claim 11 wherein said conveyor means includes a reversible conveyor carried by said telescoping boom.

13. The combination cargo loader-unloader crane of claim 9 wherein the hopper is suspended from said apron.

14. The combination cargo loader-unloader crane of claim 9 wherein said bulk material loading means includes a removable chute.

15. A combination cargo loader-unloader crane comprising
a crane frame having a folding apron,
trolley rails extending along said apron and rearward of said frame,
a trolley on said rails having reeving means for suspending a cargo container lifting spreader, a clamshell bucket, a magnet, a cargo hook, or a scrap skip,
an extendible boom having a reversible conveyor which can be arranged for operation below said apron,
a movable hopper suspended from said rails, and
a loading chute dependable from the outboard end of said extendible boom.

16. The combination cargo loader-unloader crane of claim 15 wherein the outboard end of said boom is supported in its extended position by said hopper.

17. The combination cargo loader-unloader crane of claim 16 wherein said telescoping boom and said hopper are retractable to a removed and counterbalancing position permitting said trolley cargo handling equipment access to the working area under said frame.

18. The combination cargo loader-unloader crane of claim 16 including conveyor means arranged for cooperating with said reversible conveyor when said telescoping boom is extended to operating position below said apron to transport bulk material to said reversible conveyor for loading and to take bulk material away from said reversible conveyor for unloading.

19. The combination cargo loader-unloader crane of claim 18 wherein said conveyor means comprises a pair of over-and-under conveyors suspended from said rails and arranged to permit the telescoping boom and reversible conveyor to be disposed therebetween when not in use, said conveyors being retractable with said telescoping boom to said removed position.

20. The combination cargo loader-unloader crane of claim 15 wherein said telescoping boom and said hopper are retractable to a removed and counterbalancing position permitting said trolley cargo handling equipment access to the working area under said frame.

21. The combination cargo loader-unloader crane of claim 20 including conveyor means arranged for cooperating with said reversible conveyor when said telescoping boom is extended to operating position below said apron to transport bulk material to said reversible conveyor for loading and to take bulk material away from said reversible conveyor for unloading.

22. The combination cargo loader-unloader crane of claim 21 wherein said conveyor means comprises a pair of over-and-under conveyors suspended from said rails and arranged to permit the telescoping boom and reversible conveyor to be disposed therebetween when not in use, said conveyors being retractable with said telescoping boom to said removed position.

23. The combination cargo loader-unloader crane of claim 15 including conveyor means arranged for cooperating with said reversible conveyor when said telescoping boom is extended to operating position below said apron to transport bulk material to said reversible conveyor for loading and to take bulk material away from said reversible conveyor for unloading.

24. The combination cargo loader-unloader crane of claim 23 wherein said conveyor means comprises a pair of over-and-under conveyors suspended from said rails and arranged to permit the telescoping boom and reversible conveyor to be disposed therebetween when not in use, said conveyors being retractable with said telescoping boom to said removed position.

25. The combination cargo loader-unloader crane of claim 15 wherein the outboard end of said boom is secured below and to the lower end of said hopper and said telescoping boom and said hopper are retractable to a removed and counterbalancing position permitting said trolley cargo handling equipment access to the working area under said frame.

26. The combination cargo loader-unloader crane of claim 15 wherein the outboard end of said boom is secured below and to the lower end of said hopper and conveyor means are arranged for cooperating with said reversible conveyor when said telescoping boom is extended to operating position below said apron to transport bulk material to said reversible conveyor for loading and to take bulk material away from said reversible conveyor for unloading.

27. The combination cargo loader-unloader crane of claim 26 wherein said conveyor means comprises a pair of over-and-under conveyors suspended from said rails and arranged to permit the telescoping boom and reversible conveyors to be disposed therebetween when not in use, said conveyors being retractable with said telescoping boom to said removed position.

28. A combination cargo loader-unloader crane comprising
a crane frame having a mobile base portion and an upward projecting superstructure, said base portion arranged for permitting relatively unimpeded movement of cargo transporting means and cargo from underneath said superstructure to an adjacently docked ship,
a folding apron supported by said superstructure,
two pair of trolley rails extending along said apron and rearward of said crane frame,
a sheave trolley on one pair of said apron rails and having reeving means for suspending a cargo container lifting spreader, a clamshell bucket, a magnet, a cargo hook, or a scrap skip.
a hopper trolley on the other pair of said apron rails supporting a depending hopper,
a telescoping boom having its outboard end supported by said hopper,
a reversible conveyor on said telescoping boom having its outboard end extending under said hopper,
a pair of over-and-under conveyors arranged to permit said telescoping boom and said reversible conveyor to be disposed therebetween, said over-and-under conveyors arranged for cooperating with said reversible conveyor when said telescoping boom is extended to operating position below said hopper to transport bulk material to said reversible conveyor for loading and to take bulk material away from said reversible conveyor for unloading, said telescoping boom, hopper, and over-and-under conveyors integrated for movement into operating position as a unit and for retracting to a removed position rearward of said crane frame,
a demountable telescoping loading chute dependable from the outboard end of said telescoping boom, and prime movers and power transmission means supported by said frame for powering said combination loader-unloader.

29. The combination cargo loader-unloader crane of claim 28 including beams projecting rearward of said frame for supporting both pair of apron rails rearward of said crane.

30. The combination cargo loader-unloader crane of claim 28 wherein said over-and-under conveyors are suspended from the pair of rails supporting said hopper and support the inboard end of said telescoping boom.

31. The method of converting and operating a combination loader-unloader crane having a supporting frame provided with an apron extending outboard therefrom, a movable bridge and hopper supported by said apron for extending said hopper and a loading chute outboard from said frame, means for transporting bulk material to said loading chute and away from said hopper, and means depending from said apron for combination loading and unloading cargo containers and operation of a bucket, a magnet, a cargo hook, or a scrap skip, comprising
(a) for loading bulk material,
moving said bridge outboard over an adjacently docked ship,
securing a loading chute adjacent the outboard end of said bridge and lowering the discharge end of said chute into the hold of said ship, and transporting bulk material along said bridge to said loading chute,
(b) for bulk unloading,
moving said bridge outboard over said ship,
positioning a hopper over the outboard end of said bridge,
operating a movable clamshell bucket from said apron to unload bulk material from the hold of said ship and to discharge it into said hopper, and
transporting said bulk material from said hopper inboard along said bridge,
(c) for loading or unloading operations by means of a magnet, a scrap skip, a cargo hook, or a clamshell bucket,
moving said hopper and said bridge inboard and to a position rearward of said supporting frame,
suspending a movable magnet, cargo hook, scrap skip, or clamshell bucket from said apron, and
operating said magnet, cargo hook, scrap skip, or clamshell bucket along said apron between said ship and the area beneath the supporting frame of said crane to load or unload cargo,
(d) for the loading or unloading of cargo containers,
moving said hopper and said bridge inboard and to a position rearward of said supporting frame,
suspending a movable cargo container lifting spreader from said apron, and
operating said lifting spreader along said apron between said ship and the area beneath the supporting frame of said crane to load or unload cargo containers.

32. The method of converting and operating a combination loader-unloader crane having a supporting frame provided with an apron extending outboard therefrom, a movable hopper suspended from said apron, a telescoping boom having conveyor means integral thereto, the outboard end of said boom interconnected to the lower end of said hopper, and a movable trolley on said apron reeved for suspending a cargo container lifting spreader, a clamshell bucket, a magnet, a cargo hook, or a scrap skip, comprising,
(a) for loading bulk material into ships,
moving said hopper outboard along said apron over an adjacently docked ship and extending said boom outboard therewith,
securing a loading chute to the outboard end of said boom and lowering the discharge end of said chute into the hold of said ship, and conveying bulk material along said boom to said loading chute,
(b) for unloading bulk material from ships,
moving said hopper outboard along said apron over said ship and extending said telescoping boom outboard therewith,
suspending a clamshell bucket from the reeving of said movable trolley,
operating said bucket to unload bulk material from the hold of said ship and to discharge the bulk material into said hopper, and
conveying said bulk material inboard along said telescoping boom,
(c) for operation of a magnet, a scrap skip, a cargo hook, or a clamshell bucket,
moving said hopper and said telescoping boom inboard along said apron to a position rearward of said supporting frame,
suspending either a magnet, a cargo hook, a scrap skip, or a clamshell bucket from the reeving of said trolley, and
operating said magnet, said cargo hook, said scrap skip, or said clamshell bucket between said ship and the area beneath the supporting frame of said crane to load or unload said ship, (d) for the loading or unloading of cargo containers,
  moving said hopper and said telescoping boom inboard along said apron to a position rearward of said supporting frame,
  suspending a cargo container lifting spreader from the reeving of said trolley, and
  operating said cargo container lifting spreader between said ship and the area beneath the supporting frame of said crane to load or unload cargo containers.

33. The method of converting and operating a combination loader-unloader crane having a supporting frame and provided with an apron extending outboard therefrom, a movable trolley on said apron having reeving means for suspending a cargo container lifting spreader, a clamshell bucket, a magnet, a cargo hook, or a scrap skip, a movable hopper suspended from and below said apron, a telescoping boom having a reversible conveyor supported therealong, said telescoping boom having its outboard end extending under and supported by the lower end of said hopper and its inboard end supported between, and integrated for movement with, a pair of over-and-under conveyors arranged to permit said telescoping boom to be disposed therebetween, said over-and-under conveyors arranged for cooperating with said reversible conveyor, and a loading chute secured to the outboard end of said boom, comprising
  (a) for loading bulk material into ships,
    moving said hopper outboard along said apron and extending said telescoping boom over an adjacently docked ship,
    lowering the discharge end of said chute into the hole of said ship,
    operating the reversible conveyor and the upper of the over-and-under conveyors to transport bulk material in an outboard direction, and
    feeding the bulk material to be loaded into the ship onto the inboard end of the upper of the over-and-under conveyors and conveying said bulk material to the outboard end of the upper of the over-and-under conveyors and discharging it onto the reversible conveyor and conveying it outboard to the end of the reversible conveyor and discharging it into the upper end of the loading chute,
  (b) for unloading bulk material from an adjacently docked ship,
    moving the hopper outboard along the apron and extending said telescoping boom outboard over said ship,
    securing the loading chute out of the way of the unloading operation,
    suspending a clamshell bucket from the reeving means of said trolley,
    operating said clamshell bucket to scoop bulk material from the hold of said ship and to lift the bulk material to a position above the hopper and to discharge the bulk material into said hopper,
    operating said reversible conveyor and the lower of the over-and-under conveyors in an inboard direction, and
    discharging the bulk material from the hopper onto the reversible conveyor, conveying the bulk material inboard along the telescoping boom and discharging it onto the lower of the over-and-under conveyors and further conveying it inboard and discharging it into a takeaway means,
  (c) for operation of a magnet, a scrap skip, a cargo hook, or a clamshall bucket to load or unload material from an adjacently docked ship,
    moving said hopper inboard along said apron and telscoping said boom between the over-and-under conveyors and moving said hopper and said telescoped boom and said over-and-under conveyors to a position rearward of said supporting frame,
    suspending either a magnet, a scrap skip, a cargo hook, or a clamshell bucket from the reeving means of said trolley, and
    operating said magnet, cargo hook, scrap skip, or clamshell bucket between said ship and the area beneath said supporting frame to load or unload said ship,
  (d) for the loading or unloading of cargo containers from an adjacently docked ship,
    moving said hopper inboard along said apron and telescoping said boom between the over-and-under conveyors and moving said hopper and said telescoped boom and said over-and-under conveyors to a position rearward of said supporting frame, and
    suspending a cargo container lifting spreader from the reeving means of said trolley and operating said cargo container lifting spreader between said ship and the area beneath the supporting frame of said crane to load or unload cargo containers.

34. In a combination cargo loader-unloader crane for handling both bulk material and cargo containers and having a supporting frame straddling a container storage or deposition area and an apron on the frame adapted to extend outboard therefrom and cargo handling means movable on the apron for moving cargo containers along a predetermined path to and from said storage or deposition area, the combination of conveying means and supporting means for mounting the conveying means under said apron for movement between a first position wherein said conveying means is disposed out of the path of movement of the containers and a second position wherein said conveying means occupies said path, said cargo handling means being capable of depositing bulk cargo on said conveying means when said conveying means is disposed in said second position.

35. In a combination cargo loader-unloader crane including a supporting frame adapted for movement in a cargo handling area, an apron mounted on the frame and having a portion projectable outboard therefrom, and a movable trolley mounted on the apron for movement lengthwise thereof between a first position adjacent to the outboard end of said apron and a second position within the frame; the combination of cargo handling means on the trolley for alternatively supporting a cargo container lifting spreader, a bucket, a magnet, a cargo hook, or a scrap skip; a bridge including first and second sections, and telescoping means interconnecting said sections so that said second section can move between an extended position wherein the second section is an extension of said first section and a retracted position wherein said sections are disposed alongside one another; support means for the bridge permitting movement between an extended position wherein said bridge has its second section in extended position whereby said bridge extends from the frame under said apron and a retracted position wherein said bridge with its second section in retracted position is withdrawn from its extended position and is disposed out of the path of movement of the cargo handling means within the frame; and conveying means on said bridge for moving bulk material lengthwise thereof.

36. The combination cargo loader-unloader crane of claim 35 wherein said conveying means includes a reversible conveyor on the second section of said bridge and transfer conveyor means on said first section in material-transferring relationship with said reversible conveyor.

37. The combination cargo loader-unloader crane of claim 36 wherein said transfer conveyor means on said first section includes an upper conveyor having a discharge end extending over said reversible conveyor, and a lower conveyor having a receiving end extending under said reversible conveyor.

38. The combination cargo loader-unloader crane of claim 36 wherein said transfer conveyor means on said first section includes a lower reversible conveyor in material receiving relation to said reversible conveyor on said second section for enabling said lower conveyor to discharge bulk material from either end thereof, a hopper supported within said frame below said lower conveyor, and moving means for positioning one end of said lower conveyor over said hopper.

39. The combination cargo loader-unloader crane of claim 35 wherein said apron extends rearward of the supporting frame, and said support means supports the first section of said bridge from the apron for movement of the bridge along the apron between the said retracted and extended positions.

40. The combination cargo loader-unloader crane of claim 35 wherein the first section of the bridge is an elongated box-like frame within which said second section is disposed and mounted by said telescoping means for movement into and out of said frame.

41. The combination cargo loader-unloader crane of claim 35 including a loading chute secured to the outboard end of the second section of said bridge, a hopper interconnected to said second section and positioned over said conveying means, said conveying means capable of moving bulk material outboard to said chute and moving bulk material deposited thereon from said hopper inboard toward said frame.

References Cited

FOREIGN PATENTS

| 920,252 | 1/1947 | France. |
|---------|--------|---------|
| 615,321 | 1/1961 | Italy.  |

ROBERT G. SHERIDAN, Primary Examiner

F. E. WERNER, Assistant Examiner

U.S. Cl. X.R.

214—152